March 31, 1942.  T. L. MAYEUX ET AL  2,278,084
INDICATING DEVICE
Filed April 25, 1941
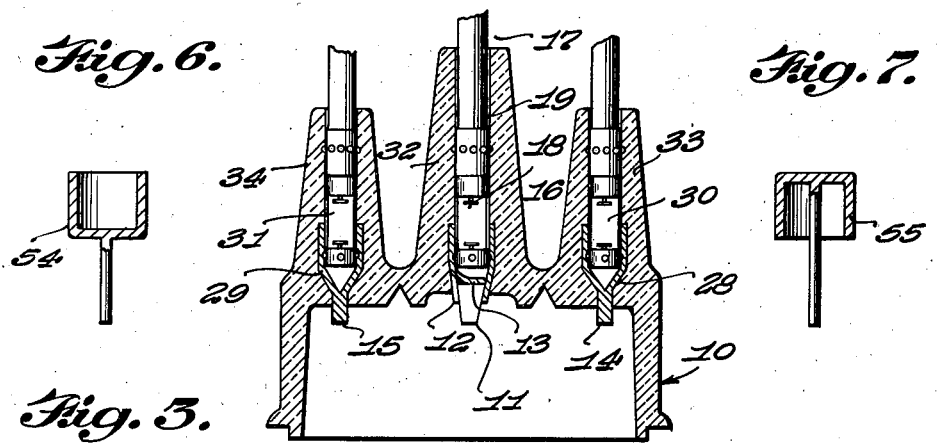
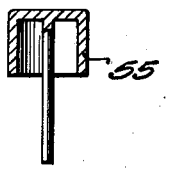
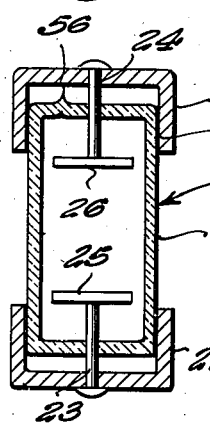
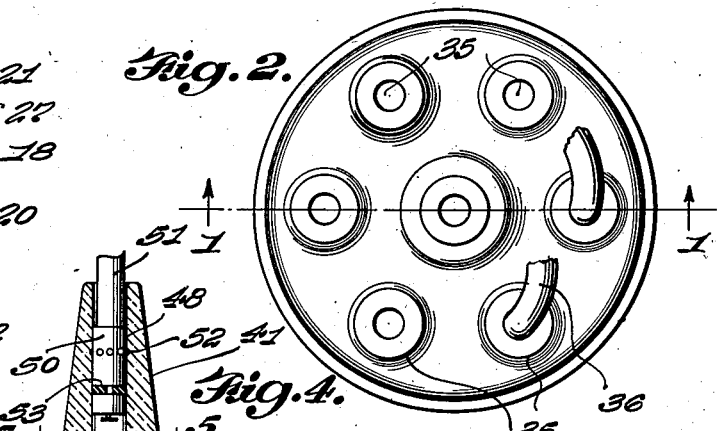
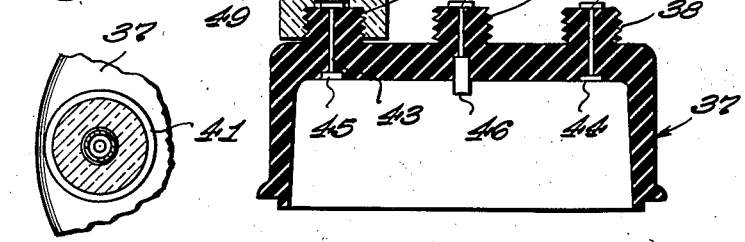
Inventor
Theard L. Mayeux
Harold A. Levey
By
Attorney Patented Mar. 31, 1942

2,278,084

UNITED STATES PATENT OFFICE 2,278,084

INDICATING DEVICE

Theard L. Mayeux and Harold A. Levey, New Orleans, La.; said Levey assignor to N. J. Clesi, New Orleans, La.

Application April 25, 1941, Serial No. 390,430

5 Claims. (Cl. 175—183)

The present invention relates to an indicating device, and more particularly, to an indicating device combined with a novel distributor cap forming part of the ignition system of an internal combustion engine.

Although indicating devices have been provided which are adapted to be arranged in circuit with the ignition system of an internal combustion engine in order to indicate the flow of current through the system, these previous devices have been largely of a temporary nature adapted to be momentarily connected in the ignition system.

Further, in devices previously provided, it was necessary either to disconnect certain of the wires in the system in order to connect the indicating device, which was intended to be manually supported, or it was necessary to provide a supporting means on the dash-board of the vehicle, or in another location.

It is one of the objects of the present invention therefore, to provide a visual indicating means, permanently connected in circuit with the ignition system and adapted to indicate whether or not the system is properly functioning.

A further object of the present invention is to provide an indicating device or devices adapted to be easily assembled with a modified distributor cap, and when so assembled, supported by the cap as an integral and permanent part thereof.

A third object of the present invention is the provision of a modified distributor cap adapted to support visual indicating units and capable of being easily substituted for the normal type of distributor cap provided in an automotive vehicle.

A fourth object of the present invention is to provide a distributor cap including at least a portion of sufficient transparency to permit the observation therethrough of visual indicating means connected in the ignition system.

A fifth object of the present invention is to provide a distributor cap integrally molded of a transparent plastic material, and adapted to support and protect small tubes adapted to glow on the passage of high tension current therethrough.

A sixth object of the present invention is to provide a distributor cap having relatively long terminal sleeves adapted to receive both indicating tube and the normal distributor leads.

A seventh object of the present invention is to provide a distributor cap with relatively long terminal sleeves which may be assembled with the cap or removed to allow a replacement thereof with normal length sleeves.

Other objects and advantages will become apparent from the subsequent description and figures of the drawing wherein:

Figure 1 is a vertical transverse section taken on the line 1—1 of Fig. 2 of one form of distributor cap according to the present invention;

Fig. 2 is a plan view of the distributor cap according to the present invention;

Fig. 3 is an enlarged detailed section of one of the indicating elements;

Fig. 4 is a transverse vertical section of a modified form of distributor cap;

Fig. 5 is a horizontal section taken along the line 5—5 of Fig. 4;

Fig. 6 is a detailed section of a modified form of electrode;

Fig. 7 is a section of a second modified form of electrode.

Referring to the drawing, and particularly Fig. 1 thereof, the modified distributor cap is indicated in general at 10. It is to be understood that this distributor cap is adapted to be positioned on the normal distributor of an automotive vehicle and when so positioned, will cooperate in the normal fashion with the rotatable arm, forming a part of the conventional distributor.

Thus, the distributor cap as shown, is provided with a centrally positioned central terminal member 11, which is carried within a metallic sleeve 12, and spring pressed in a downward direction by a spring 13. The terminal portion, 11, is adapted to ride on the central portion of the normal distributor arm as hereinbefore set forth.

It is to be understood that the distributor cap is also provided with a plurality of circumferentially disposed terminal members of which two are shown in Fig. 1, and indicated by the reference numerals, 14 and 15. Obviously, as in the conventional distributor, the number of circumferential terminals will vary in accordance with the number of cylinders in the engine of the automotive vehicle.

The sleeve 12 is adapted to be bonded with the distributor cap when the cap is molded and its upper end is provided with a relatively large, generally cylindrical portion adapted to form a seat.

This seat is indicated by the reference numeral 16 and is adapted to conform in general size to either the end of a metal shod lead 17 which is adapted to connect the terminal portion 11 and the coil of an ignition system, or to a generally cylindrical indicating tube 18. As shown in Fig. 1, the indicating tube 18 is interposed between the metal shod tip 19 of the lead 17 and the spring 13.

Referring to Fig. 3, it will be noted that the indicating tube 18 comprises a tubular main portion 20, which is adapted to be evacuated and filled with a suitable inert gas and then sealed to form a gas-tight enclosure, and a pair of metal end caps 21 and 22. Each end of the cylindrical portion 20 carries one of a pair of electrodes 23 and 24 provided with a pair of plate like portions 25 and 26, respectively. The plate like portions extend a substantial distance into the enclosed portion of the tubular structure and are firmly bonded with the glass in which the tubular structure is preferably made in order to prevent the leakage of gases at their points of entry into the enclosure.

The outer ends of the terminals 23 and 24 are fastened to the caps 21 and 22, as by riveting, brazing, welding, or in any other suitable manner. In order to produce a firm homogenous structure the caps 21 and 22 are united with the cylindrical portion 20 by a suitable cement, as for example a silicate cement as indicated at 27.

It will be understood that when high tension current is supplied to the terminals 23 and 24, the discharge across the plates 25 and 26 will produce a glow or a luminescense through the gas contained within the cylindrical portion 20. Referring once again to Fig. 1, it will be noted that the metal terminals 14 and 15 are also provided with an upper sleeve like portion, each respectively indicated at 28 and 29, and adapted to receive a lower end of indicating members or cylindrical glow tubes 30 and 31, respectively. These glow tubes are entirely similar to the tube 18 and are similarly provided with terminals and caps, and so forth.

The distributor cap 10 in this modification is integrally molded throughout of a suitable transparent, or semi-transparent plastic, and it will be noted that each of the glow tubes is surrounded by an elongated sleeve portion or housing forming an integral part of distributor cap 10. Thus the central glow tube 18 is surrounded by cylindrical sleeve portion 32 and the tubes 30 and 31 by the portions 33 and 34, respectively.

It will be noted in this connection that these elongated sleeve like portions are of lengths substantially greater than the normal cylindrical sleeves provided in the conventional distributor cap. Obviously these sleeves may be of any substantial length, providing they are of sufficient length to house both the indicating device hereinbefore described and the metal shod ends of the leads connecting the distributor cap conducting portions with ignition coil and spark plugs.

Referring to Fig. 2, it will be noted that in addition to the sleeve hereinbefore described, four other circumferential sleeve structures are provided as indicated at 35, and as shown each of these sleeve structures is adapted to receive suitable lead wires 36 connecting the indicating devices which are housed within the sleeve structure, with the rest of the ignition system. Although six circumferential terminal sleeves are therefore shown, it is to be understood that this number may be varied in accordance with the functioning cylinders of the automobile and from four to eight terminals may be provided.

Referring to Fig. 4, there is here shown a modified form of distributor cap indicated in general at 37. In this form of the invention the integral elongated sleeves are omitted and the cap 37 is provided with a plurality of circumferentially threaded projecting portions as indicated at 38, 39 and 40. These projecting portions are provided centrally thereof with cores of conducting material at 41, 42 and 43. The two outer conducting portions 41 and 43 are provided at each end with enlarged sections 44 and 45. It is to be understood that the portions 44 and 45 are adapted to fulfill a similar function to the conducting terminals 14 and 15 of Fig. 1, that is, they are adapted to be contacted by the usual end of the moving distributor arm in order to momentarily complete a circuit in the proper sequence to the spark plugs of individual cylinders. The conducting core 42 of the central projection 39 is provided at its lower end with an integral conducting portion 46 which is adapted to ride on the center of the rotating distributor arm and establish a circuit between this rotating arm and the high tension coil. Each of the projecting portions 38, 39 and 40 has threaded thereon a transparent sleeve like member entirely similar to the sleeve like member shown as carried on the projecting portion 40 and indicated by the reference numeral 47.

As shown the member 47 is provided with a central bore 48 which is adapted to receive an indicating tube 49 similar to the tube 18 previously described. The bore 48 is also adapted to receive the metal shod end 50 of a lead 51 which is connected in a conventional manner at its other end to a conventional spark plug not shown. It is also to be understood that the metal shod end 50 is provided with projections 52 adapted to fit into similarly shaped openings, or into an annular groove in the sleeve 47, in order that the lead may be retained within the tubular sleeve 47. Interposed between the upper end of the indicating member 49 and the metal shod end 50 is a circular disk 53 or washer made of a suitable insulating material, such as vulcanized fiber, Bakelite or other plastic material. The outer diameter of this disk conforms to the bore 48 and the disk is provided with a central small opening through which the high tension current jumps from the end cap of the indicating device 49 to the metal end 50 of the lead 51.

It is obvious that in this form of the invention the tubular sleeve 47 is readily detachable from the cap 37 and that sleeves may therefore be provided of any desired length. It is further evident that this form of the invention lends itself readily to the separate fabrication of the sleeves and the cap proper. Preferably, although not necessarily, in this form of the invention the cap proper is molded from the conventional plastic material of an opaque character, and the sleeves 47 from a transparent plastic material.

In this form of the invention it is obvious that the indicating tubes 49 may be more easily removed from the sleeves and replaced. The sleeves of the modified form of cap, as well as the entire distributor cap shown in Fig. 1, are preferably molded or constructed from material sufficiently transparent to render visible the glow of the indicating tubes, such as the tube 18. As an example, the cap and sleeves may be fabricated from glass of the low temperature expansion boro-silicate type such as "Pyrex," or from the newer type of so called tempered glass which is shatter resistant. In addition many of the newer plastic compositions may also be used, and include such types as cellulose acetate, ethyl cellulose of the proper variety, cast and compression molded phenolics, vinyl esters, vinyl acetals, acrylic esters, poly-styrenes, and similar products. The prerequisite being that the material of construction be transparent and nearly colorless, and possess a high dielectric value, low moisture absorption, resistance to moderate temperature rises, and incapable of distortion in shape with long use.

The entire cap may be made from such transparent material or the base may be made of an opaque material and the sleeves which may be either integral or removable made from a transparent material as shown on the drawing.

Preferably the indicating device or tube as shown in Fig. 3 is approximately 5/16" in diameter and from 3/8" to 3/4" long. The electrodes 23 and 24, and particularly the disk ends thereof 25 and 26, are made from some suitable corrosion resistant alloy, as for example the various chromium steels, Inconel, Monel or metals such as tungsten, tantalum, etc. Preferably the shank of the electrodes 23 and 24 is made of nickel-iron wire or other alloy material which possesses the same temperature coefficient as that of the glass cylinder used in order to prevent separation of the glass and metal. In the place of a simple plate like structure such as shown at 25 and 26, these terminals may exhibit a general cup like form such as that shown in Fig. 6, and indicated by the reference numeral 54.

Still another modified form of terminal is that shown in Fig. 7 at 55, wherein the terminal possesses the shape of an inverted cup. In addition to these modified forms of electrodes, an electrode having an end of fine wire mesh screen may be used in order to effect a greater area of contact between the electrode and the inert gas with which the tube is normally filled.

In producing the indicating tubes, the tube is initially evacuated to free it from air and then resealed at the point indicated at 56. Prior to the sealing of the tube, and after the air is evacuated, the tube is filled to the proper pressure with such inert gases as neon, argon, crypton and/or carbon dioxide. In addition to the inert gas, a coloring metallic vapor is also supplied to the tube, as for example the vapors of mercury sodium, potassium, or the like. The metal tube caps 21 and 22 may be fabricated or spun from brass, copper, Monel, nickel, or other similar materials, and in place of the silicate cement indicated at 27, other cements may be used to join the cap and cylindrical glass tube.

In the operation of the device herein described, it is obvious that the central tube 18 will exert a continuous luminosity which fluctuates in cycle with the frequency of the high tension current feed from the primary coil of the ignition system. The indicating tube, such as tubes 30 and 31 however, will be illuminated only when the distributor arm makes a circuit between the center terminal 11 leading to the coil and each of the respective circumferential terminals such as terminals 14 and 15. The glow of the central tube will therefore be substantially continuous in nature since the distributor arm causes one cylinder to either fire, or be close to firing at any given time.

What is claimed is:

1. In combination, a distributor cap for an automotive ignition system, an indicating tube connected in the circuit of the ignition system and adapted to glow upon the passage of the ignition current therethrough, a seat for said indicating tube on said cap, and a housing about said tube supported by said cap, said housing and cap being integrally formed from a plastic material of sufficient transparency to render visible the glow of said tube therethrough.

2. In combination, a distributor cap for an automotive ignition system, an indicating tube connected in the circuit of the ignition system and adapted to glow upon the passage of the ignition current therethrough, a projecting portion on said cap adapted to form a seat for said indicating tube, said projecting portion being provided with a threaded circumference, and a housing sleeve having an internally threaded end adapted to cooperate with the threaded circumference of said projection and an internal bore adapted to receive said indicating tube, said housing sleeve having at least a portion of sufficient transparency to render visible the glow of said tube.

3. In combination, a distributor cap for an automotive ignition system, a plurality of indicating tubes connected in the circuit of the ignition system and adapted to glow upon the passage of the ignition current therethrough, a central projecting portion and a plurality of circumferential portions on said cap, each adapted to form a seat for one of said indicating tubes, said projecting portions being each provided with a threaded circumference, and a plurality of housing sleeves each having an internally threaded end adapted to cooperate with the threaded circumference of each of said projections, and internal bores adapted to receive said indicating tubes, each of said housing sleeves having at least a portion of sufficient transparency to render visible the glow of said tubes.

4. In combination, a distributor cap for an automotive ignition system, a plurality of indicating tubes each connected in circuit between said distributor cap and the ignition device for a respective engine cylinder, said indicating tubes being adapted to glow upon passage of current therethrough, and a plurality of vertically extending projecting housings removably mounted on said distributor cap, each housing being adapted to circumscribe one of said indicating tubes, said housings being formed of a transparent plastic material.

5. In combination, a distributor cap for an automotive ignition system, a plurality of projecting portions integral with and extending from the upper surface of said distributor cap, a conducting terminal upon each projecting portion, a plurality of indicating tubes each connected in circuit between said distributor cap and an ignition device for a respective engine cylinder, said indicating tubes being each adapted to glow upon passage of current therethrough and being each seated upon a respective conducting terminal of a respective projecting portion, and a plurality of vertically extending projecting housings each surrounding one of said indicating tubes and retaining the same in place upon said projecting portion, said housings being formed of a transparent plastic material and being removably secured to said respective projecting portion.

THEARD L. MAYEUX.
HAROLD A. LEVEY.